D. Willis,
Toy.
No. 90,801. Patented June 1, 1869.

Witnesses.
John F. Brooks.
Wm. F. Clark.

Inventor.
D. Willis
per Munn & Co.
Attys.

United States Patent Office.

DANIEL WILLIS, OF JERSEY CITY, NEW JERSEY.

Letters Patent No. 90,801, dated June 1, 1869.

TOY.

The Schedule referred to in these Letters Patent and making part of the same.

*To all whom it may concern:*

Be it known that I, DANIEL WILLIS, of Jersey City, Hudson county, New Jersey, have invented a new and improved Toy; and I do hereby declare that the following is a full, clear, and exact description thereof, which will enable others skilled in the art to make and use the same, reference being had to the accompanying drawings, forming part of this specification.

Similar letters of reference indicate corresponding parts

Figure 1:
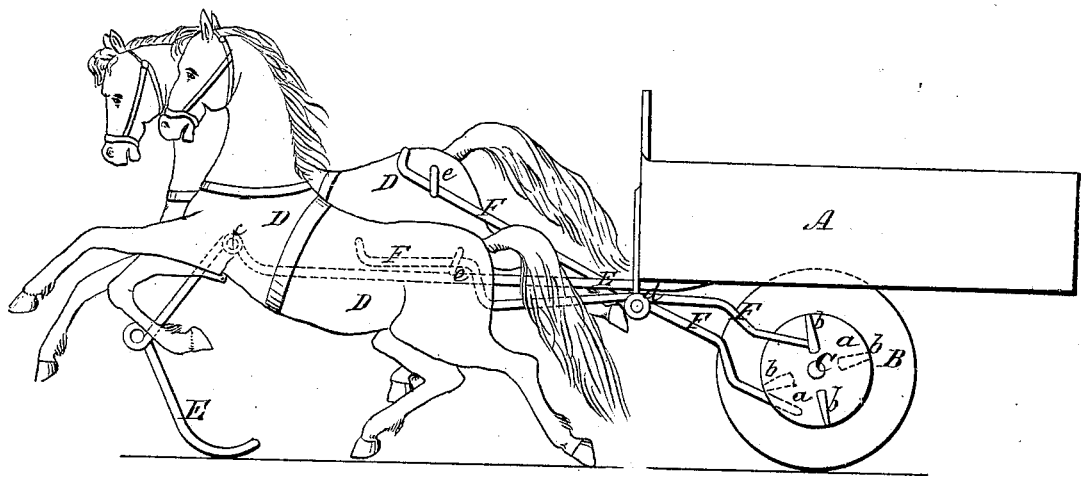
Figure 1 represents a side elevation, partly in section, of my improved toy.

This invention relates to a new toy of that class in which figures of animals, such as horses, &c., are arranged in front of a toy-cart or wagon, the object of the invention being to impart to such figures a motion similar to that of living animals, so that when the toy-vehicle is drawn ahead, the animals in front will move in a life-like manner.

The invention consists in pivoting the bodies of such imitation animals to the pole or other part of the toy-wagon, and in connecting the same, by means of rods or otherwise, with a cam or wheel on the revolving axle of the wagon, or with some other revolving part of the same.

As projecting lugs on the wheel or cam strike the ends of the rods, the same are oscillated, to impart similar motion to the bodies of the imitation animals.

A, in the drawing, represents the body of a toy-wagon or vehicle;

B is one of its wheels; and

C, the axle of the same.

Figure 2:
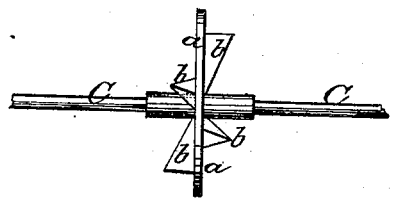
Figure 2 is a detail end view of the same.

The axle, if revolving with its wheels, can carry a disk, $a$, from which the lugs $b\ b$ project, as shown in fig. 2. These lugs may, however, also be arranged on the wheels B directly, if desired.

D D are imitation horses or other animals, pivoted, by means of pins $c$, to the pole E of the vehicle. They are pivoted so as to be heavier at one, say the rear end, so that they will have the tendency to have their front ends elevated.

Rods F F are pivoted by pins $d$ to the pole or other part of the wagon, and reach with their rear ends back to the wheels B, or disk $a$, while their front ends are fitted through staples or eyes $e$, formed on the heavier parts of the animals. When a lug, $b$, during the rotation of the wheel or disk, strikes the rear end of a rod, F, it will depress the same, and will thereby cause the rear end of the horse to be elevated. The front end of the pole is or should be bent down, to prevent the animals from reaching the ground during their oscillations.

The rods F may as well be connected with the lighter parts of the animals, to depress the same when acted on by the wheel or disk, and they may in any other manner, besides by lugs, be connected with the wheel-axle or disk on the wagon. One single horse may be on one wagon, and may be oscillated in similar manner.

All kinds of animals arranged on other kinds of toys, may be operated in similar manner, by the motion of the vehicle or device with which they are connected.

I claim as new, and desire to secure by Letters Patent—

1. A toy-vehicle, provided with pivoted representations of animals, which are set in motion when the vehicle is drawn ahead, substantially as herein shown and described.

2. Connecting the pivoted representations, D, of animals, by means of the rods F, with the revolving wheels or axles of toy-vehicles, so that they will be oscillated when said axles or wheels are revolving, substantially as herein shown and described.

The above specification of my invention, signed by me this       day of       , 1869.

DANIEL WILLIS.

Witnesses:
  A. V. BRIESEN,
  E. GREENE COLLINS.